Sept. 5, 1939.　　　　　G. T. BALFE　　　　　2,171,530
LAMINATED MATERIAL
Filed June 30, 1936　　　　3 Sheets-Sheet 1
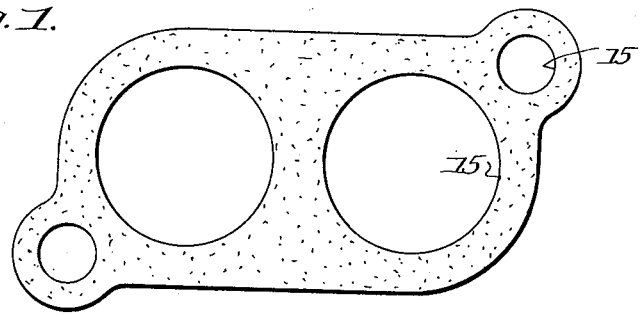
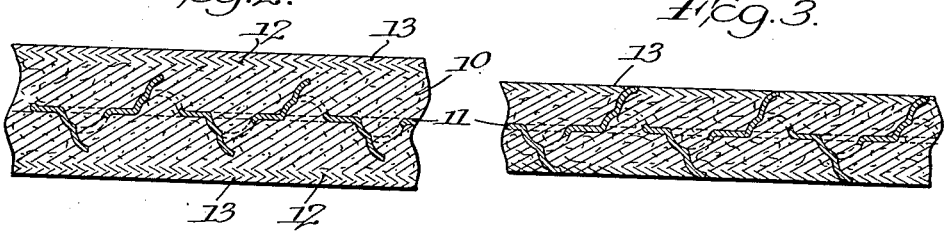 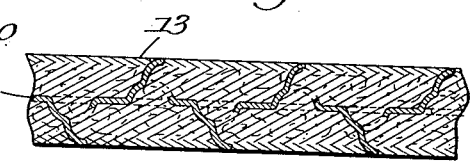
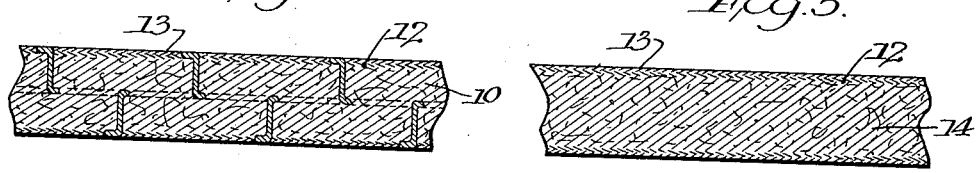 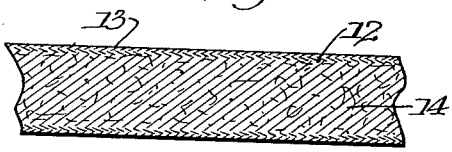
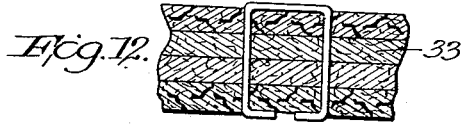 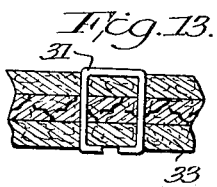
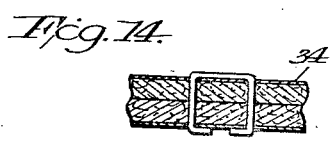
Inventor
George T. Balfe
By Cushman Darby & Cushman
Attorneys Sept. 5, 1939.   G. T. BALFE   2,171,530
LAMINATED MATERIAL
Filed June 30, 1936   3 Sheets-Sheet 2
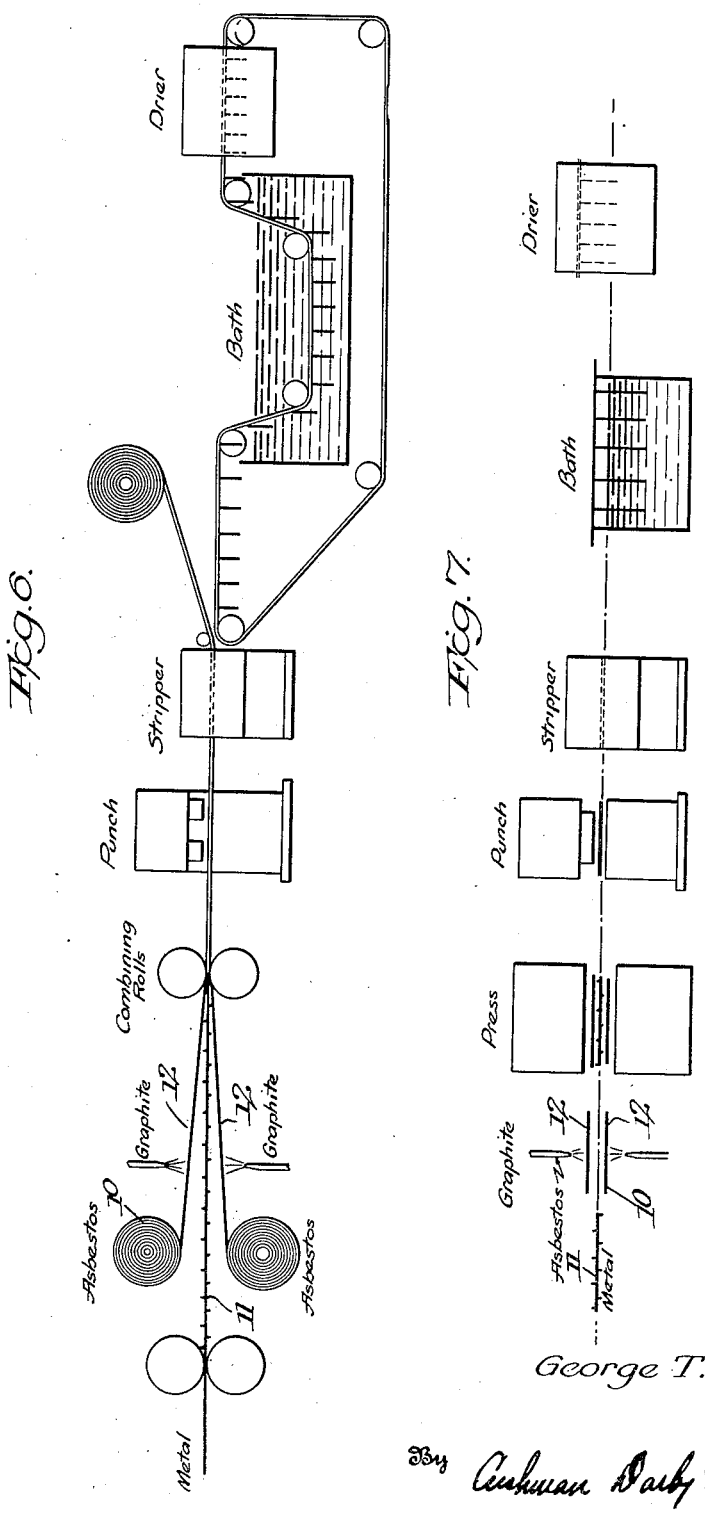

Sept. 5, 1939.　　　　　G. T. BALFE　　　　　2,171,530
LAMINATED MATERIAL
Filed June 30, 1936　　　　3 Sheets-Sheet 3

Inventor
George T. Balfe.

By Cushman Darby & Cushman
Attorneys

Patented Sept. 5, 1939

2,171,530

UNITED STATES PATENT OFFICE 2,171,530

LAMINATED MATERIAL

George T. Balfe, Detroit, Mich., assignor to Detroit Gasket & Mfg. Company, Detroit, Mich., a corporation of Michigan Application June 30, 1936, Serial No. 88,233

15 Claims.  (Cl. 154—2)

My invention relates to gasket material and gaskets and a process of manufacture, and is particularly concerned with a laminated product. For example, one layer will consist of fibrous or other compressible material and another of a protective layer. A stratum of a non-sticking agent such as graphite and a metal layer also are preferably employed.

The gaskets are useful in the automotive industry for example in connection with cylinder heads and exhaust outlets, as well as oil, water, and gas connections, and numerous other applications.

An object of the invention is to produce a gasket of increased strength having a relatively hard, tough, outer surface layer or portion which will be resistant to deteriorating influences surrounding the handling incident to packing, storing and shipment of gaskets and which likewise will afford amplified sealing qualities and resistance to blowing, burning and other conditions surrounding the gasket function.

A further object of the invention is to provide a gasket with a protective layer which will be relatively harder than the compressible or fibrous material, but which will not interfere with the compressibility of the fibrous material.

Another object of the invention is to produce a gasket which will be capable of resisting the action of heat, oil, gases and water, as well as other chemical and physical conditions such as wide variations in temperature and pressure encountered in the application of gaskets.

The invention aims also to produce gasket material and gaskets wherein the fibres at the exposed area will be thoroughly bonded together to thereby strengthen the gasket against tearing strains due to pressure and render it substantially impervious to gases and liquids.

It is the present practice to provide gaskets having asbestos gasket material layers with a non-sticking layer of graphite or graphite mixture. The present invention has, as its object, to provide a protective layer for said graphite layer, whereby, when the gasket is handled as well as while it is in use, this graphite layer will be preserved in order that it may accomplish its purpose of overcoming the possibility of the gasket sticking to the joint surfaces, for example, metal surfaces. In this connection the superposed protective layer also provides a non-sticking contact surface in addition to maintaining and bonding the graphite layer to the fibrous material.

It is another object of the invention to form the surface with a protective layer which, on drying, will be abrasion resistant and which also will form a sealing skin not only about the exposed faces of the gasket where it protects the graphite layer, but also the exposed edges thereof, whereby the fibrous layers are maintained fresh and prevented from drying out in storage and in the case where a metal insert is used, this will be prevented from rusting or oxidizing.

I accomplish these results by producing on the surface and exposed portions and edges of the fibrous material and metal insert where employed or preferably over the exposed graphite layer and exposed edge portions of the gasket, a layer of silicate of soda, shellac or commercial varnishes such as are adaptable for the purpose. These substances are presented to the gaskets or the sheets from which they are formed, in a liquid or flowable state as by bath treatment, whereby the fibrous material is permeated with the surface layer material and the gasket or sheet entirely sealed or enveloped in the layer forming material. Upon drying I find this material has the functions above ascribed to it and materially adds to the life and effectiveness of the gasket.

A further object of the invention is to provide a gasket wherein the fibrous material layers are permeated with a suitable waterproof adhesive which will be selected to be resistant to all of the various chemical and physical conditions incident to gasket use.

I control the amount of waterproof adhesive incorporated in the fibrous gasket layers and in that manner regulate the extent of permeation and the amount of the material constituting the protective surface layer which will be present in the final gasket or sheet material.

By reason of this, the nature and quality of the surface layer can be readily regulated and its thickness varied in accordance with the conditions under which the gasket is to be applied.

Another object of the invention is to provide a substantially continuous process of manufacture of the sheet material and the gaskets produced therefrom.

A further object of the invention is to provide a laminated structural material useful particularly for automobile tops. This material comprises a suitable base or fibrous sheet to both sides of which is applied a reinforcement of perforated metal having projections which are embedded in the sheet by pressure. The composite structure may be suitably lacquered or finished, for example, with a fabricated top covering, as well as receiving a surface of upholstery or interior trimming material. The product is strong, sound absorbent and will not warp or crack. It is easily applied and removed and constitutes a unitary article.

A further object of the invention is to provide a novel gasket wherein two or more gasket structures made in accordance with my Patent 1,927,450, or my Patent 1,776,140 and application 1,928,585 or combinations of these are superposed, and securely united by stitching. The composite gasket so produced may be of any desired thickness and composition to meet various requirements.

Referring to the drawings:

Figure 1 is a top plan view of a gasket having the form shown in my Patents 1,776,140 and 1,927,450 to which the present invention is applied.

Figures 2 and 3 are sectional views of gaskets illustrated in my said Patent 1,776,140 having the laminated structure of this invention.

Figure 4 is a similar view of a laminated structure in accordance with this invention, the gasket being that illustrated in my said Patent 1,927,450.

Figure 5 is a view showing a layer of the laminated gasket material in accordance with this invention.

Figure 6 is a diagrammatic view showing one method of continuously producing composite gasket material and forming the complete gaskets therefrom.

Figure 7 is a view diagrammatically showing a modified method of producing composite gasket material and the complete gaskets therefrom.

Figures 12, 13 and 14 are similar views in which layers devoid of metal are employed.

Figure 8:
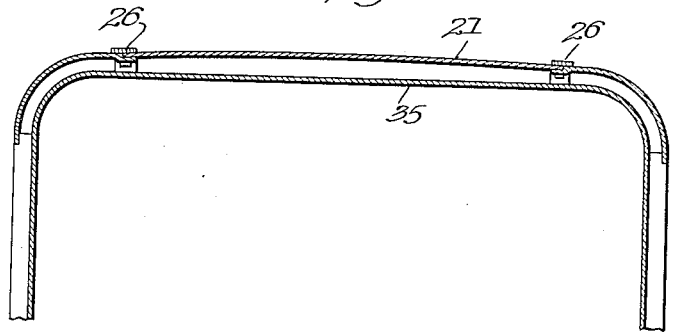
Figure 8 is a side elevation of the top frame of a motor vehicle.

Referring to Figures 2, 3 and 4, the fibrous gasket material layers which are preferably of asbestos are illustrated at 10. The gasket is provided with a metallic insert 11, preferably of sheet steel which in Figs. 2 and 3, has a multiplicity of protuberances and tangs projecting beyond the apex thereof, which tangs are deformed as shown in Fig. 2 or extend through the gasket layers and are deformed and clenched over to lie in the plane of the surface of the gasket as shown in Fig. 3, where they come in contact with the metal or other surfaces of the joint and act as conduits for the transfer of heat. The construction shown in Fig. 4 is similar to that set forth in my Patent No. 1,927,450, wherein the tangs extend through and are clenched over to lie likewise in the plane of the gasket material and in contact with the surfaces of the joint to act as heat conduits.

The projections are closely compacted or spaced over substantially the entire area of the core or insert and preferably extend through the layers of gasket material and have their ends clenched over to be completely in the plane of the outer surface forming a smooth substantially unobstructed contact surface. They are (1) protuberances having tangs extending therefrom as in my aforesaid patent; (2) struck-up tangs as in my said Patent 1,927,450, as well as formed in accordance with my Patent 1,927,791.

The projections in the several views not only act as metallic paths or heat conduits for overcoming the insulating effect of the gasket material, i. e., to dissipate the heat, but of equal importance act as springs. That is to say, the tongue-like projections of metal have a resilient co-efficient amplifying the inherent resiliency of the gasket layers and in this manner the gasket is maintained live. Furthermore, since the springy tangs or projections will resist compression to a greater degree than the asbestos or other gasket material, they will act as a cushion means to limit compressibility of the gasket as a whole. Thus undue mashing or disruption of the gasket material is prevented, since the projections are closely spaced or compacted and the metal insert is substantially coextensive with the gasket layers.

I preferably incorporate in the asbestos sheets a suitable waterproofing adhesive, as for example those referred to in my Patent 1,788,041, that is oleates, rubber mixtures, stearates, resinates, asphalts and bitumens. In fact, any suitable waterproofing material having the adhesive qualities of these substances and which will withstand the heat and pressure and the action of gases characteristic of the conditions surrounding the use of a gasket may be employed.

The waterproof adhesive will be incorporated in any customary way, and sheet material produced having the form of flat strips or in rolls, comprising asbestos fibres and having a waterproof adhesive incorporated therein.

It is important that the amount of waterproof adhesive present in the final sheet material be regulated.

For example, I will produce a web having a minimum of waterproof adhesive and which will absorb a maximum of the surface layer material. As a further embodiment, I will produce a web having substantially the maximum amount of waterproof binder incorporated therein and this will permit permeation by a relatively small amount of the surface layer material. Hence, by controlling the amount of waterproof binder, I can regulate the permeation and thickness of the material constituting the hardened surface layer and produce smooth uninterrupted contact surfaces.

It is the province of the present invention to provide the exposed areas of the gasket with a hardened surface layer or film 13, that is to say, a layer which will be relatively harder than the compressible fibrous material, but which will be quite thin and not interfere with the compressibility of the gasket. Such layer, as stated above, will be abrasion resistant and non-sticking and resistant to the various physical and chemical conditions surrounding the use of the gasket, and of particular importance, will act as a binder for the fibres of the asbestos. With these characteristics in mind, I form the surface protective layer or skin from a liquid in which the gasket or the sheet material is immersed and saturated, and which, on drying, imparts the required properties to the gasket and forms the desired lamina and continuous envelop or skin.

The permeation with the material forming the hardened surface layer will be determined by the amount of waterproof adhesive incorporated or present in the sheet as explained, and the speed of travel of the gaskets or sheets through the bath or the period allowed for their immersion. In this manner, if the fibrous layers have a large percentage of waterproof adhesive incorporated therein, a relatively smaller amount of the surface layer forming material will be incorporated. On the other hand, if the gasket layers have a smaller percentage of waterproof adhesive incorporated therein, there will be a greater amount of the surface layer forming material present.

In the manufacture of a gasket in accordance with this invention, the steel insert material 11 is passed from a roll or from a forming machine either as a continuous strip as shown in Figure 6 or in strips or sheets of required length as shown in Figure 7 and the asbestos sheets or strips having a waterproof adhesive incorporated therein are passed from one or more rolls, depending upon whether one or both sides of the insert are to carry a gasket material layer, or the fibrous gasket material may be fed in preformed severed sheets approximately of the size of the insert sheets. The asbestos sheets before being presented to the metal insert are sprayed with graphite or a graphite mixture to produce on the exposed surfaces of the asbestos layers, a stratum or thin layer 12 which will be non-sticking. The asbestos layers so treated are then presented upon one or both sides of the metal insert material and compressed together by means of a combining machine employing rolls in the continuous operation (Figure 6), or any suitable press or rolls as where preformed sheets or strips of the respective layers are employed (Figure 7). The pressure employed will produce the articles shown in Figs. 1, 2, 3 and 4, and it will be understood that the asbestos layers may be of the desired thickness to produce an article as shown in Fig. 2 or one as shown in Figs. 3 and 4. Thereupon, the gasket material comprising the metal insert and the gasket layers united thereto, as shown in the drawings, is presented to a punch and the gaskets of required size and shape produced. The raw gaskets so formed having a layer of metal and one or more layers of fibrous gasket material with a superimposed layer of graphite, are stripped from the press and passed through a tank which contains the material for producing on the surface of the gasket over and through the graphite layer an abrasion resistant, relatively hard film or layer 13 of desired thickness and preferably relatively thin as shown in the drawings which is likewise resistant to the various chemical and physical factors surrounding the gasket use and will bind the fibres together.

This tank will contain a mixture of various adhesive compositions such as silicate of soda or water glass, shellac, lacquer or varnish mixtures which are commercially well known and which are air-drying or can be dried by means of a raised temperature.

As shown in the drawings, the gaskets are carried by a suitable conveyor through the bath and are removed and may be then passed through a drier or simply air-dried in accordance with the nature of the material in the bath.

By the drying operation, I remove a substantial percentage of the moisture which may be present in the gasket, so that the final product will be completely free from objectionable moisture such as would tend to disrupt the gasket and in some cases promote sticking under high temperatures. I pass the gasket from the bath into a suitable heating chamber or oven and maintain the gaskets in the heated atmosphere for various periods of time to assure that the moisture content is reduced to a safe minimum percentage. This baking operation may be conducted at various temperatures and for various time periods and I have used temperatures up to 180° F. and have conducted the drying or baking for a period of one-half hour. It will be understood that these temperatures and time periods are approximate, since in many cases air drying will suffice and relatively low temperatures may be used for short periods to obtain optimum results. I find, however, that by this drying or baking treatment, that the gasket is freed of any objectionable moisture content. In some cases, I also give the gasket a final compressing operation between rollers or other pressure means following the drying or baking operation.

A further advantage of the drying or baking treatment resides in its producing a substantially complete and uniform setting of the hardening layer which is highly advantageous.

The surface layer forming material when dry will produce a protective laminae and envelop having the properties above indicated.

Referring to Fig. 6, I have indicated one method for accomplishing a continuous operation where the gasket material and metal insert are fed as continuous strip material. In Fig. 7, I have illustrated a similar process wherein the composite sheets of predetermined size are first produced and the gaskets then formed therefrom.

It will be observed that the present invention further comprehends the production of a composite gasket material in sheet or strip form, since I may eliminate the punching operation and pass the sheets from the combining machine directly into the bath to produce thereon the desired surface layer and envelop.

If the gasket material layers have a relatively large percentage of waterproof adhesive and graphite, the permeation will be reduced. On the other hand, if the gasket material layers have a relatively smaller percentage of waterprooof adhesive and graphite, a greater permeation and saturation with the material in the bath will be obtained. In this manner, the surface characteristics of the gasket can be very exactly controlled and the hardness and resistance definitely regulated for the various adaptations of the gasket. Again, the thickness of the surface layer and envelop and hence its relative hardness with respect to the compressible or fibrous material will be regulated by the immersion treatment.

It will be understood that the layer of graphite, as well as the hardened surface layer, are relatively thin as compared to the thickness of the fibrous gasket material layers, but, of course, the thickness of these respective layers may be varied, as desired.

It is further to be noted that the surface forming material not only acts as a binder for the fibres of the asbestos layers, but also acts as an adhesive to unite the graphite layer to the gasket material. In this connection the relative thickness of the respective graphite and hardened surface layers is such that the graphite layer is not prevented from exerting its function when applied to a joint, nor is the compressibility of the fibrous material substantially interfered with. The surface layer, however, forms a protective cover to prevent scraping off or rubbing of the graphite layer in the handling and shipment of the gasket. In other words, the surface layer preserves the life of the graphite layer at all times without interfering with its function, i. e., the surface film is rupturable.

Referring to Figure 5, the asbestos layer 14 is not provided with a metal insert, but is similarly permeated with a waterproof adhesive, and has its surface formed with a layer of graphite or graphite mixture 12. When the final product is sheet material, the graphited asbestos is passed through the bath to produce the hardened layer thereon. Where, however, gaskets are to be formed in the operation, the graphited fibrous layer is punched as described and the gaskets passed through the bath to obtain the complete laminated gasket with a hardened surface layer and envelop.

Referring to Fig. 1, it will be observed that since the gaskets are formed and thereafter dipped in a suitable bath of the surface layer forming material, the exposed edges 15 of the passages or openings and the marginal edges of the gasket will be covered with a layer or film of the surface layer material. In this manner, the exposed edges of metal, asbestos, and graphite, as the case may be, are protected and a complete seal surrounding both the exposed faces and exposed edges of the gasket is provided. This is important in that it preserves the freshness of the gasket and prevents any drying out of the fibres or the adhesive incorporated in the sheet. In other words, the surface layer material constitutes an envelop in addition to possessing the desirable properties outlined.

The laminated material of this invention and the gaskets produced therefrom comprise a metal layer, a fibrous gasket layer or other compressible material upon one or both sides thereof, a thin layer of non-sticking material such as graphite on the exposed surfaces of the fibrous layers and a layer which, on drying, forms a hardened lamina, and which permeates the fibrous material to bond the fibres and also forms a seal for the entire exposed portions of the gasket. This hardened surface layer does not interfere with the compressibility of the gasket nor the effectiveness of the non-sticking layer, and as stated, it is, when dry, likewise non-sticking.

In forming a surface layer which is smooth and relatively hard as herein described and of a material which permeates the fibre layers and bonds the fibres together, I produce a gasket which will have a greater resistance or imperviousness to the passage of water, oil and gas pressures than has heretofore been obtained. That is to say, the gasket at its surface portions is made substantially impermeable which is highly important to affect a complete seal, and this result is obtained by the presence of the surface layer and by its uniting the adjacent fibres tightly together and filling any pores in the fibrous layers. This is particularly important since where an insert having projections is combined with the gasket layers by pressure, should any fissures develop, these are effectively closed by the surface layer material and the fibres are bonded together and to the projections.

In some case, I may eliminate the intermediate graphite layer and simply incorporate the surface forming material in the asbestos or compressible layers. In other cases, I may eliminate the use of a waterproof adhesive and rely upon the incorporation of and thickness of the surface layer forming material to give the gasket structure added strength.

In addition to asbestos as the compressible gasket material, I also use cork, asbestos mixtures, rubber and paper and in fact various compressible and flexible materials.

I have described the surface layer as comprising an adhesive composition of which there are various types available and this adhesive as stated, binds the graphite to the gasket material layer as well as binds the fibres or components of the gasket material layer together.

Since the layer forming material permeates the graphite as well as the compressible gasket material layer, the surface of the gasket partakes of the nature of mixture of the adhesive and graphite in which the graphite particles are covered and bonded together and to the compressible layer.

While I have indicated that the surface layer material when dry is hardened, this is relative in that the gasket may be subjected to flexing and compression without cracking the surface layer or destroying its adhesive effect on the fibres or graphite. The surface film is, however, rupturable in that when compressed between surfaces, it breaks to the extent of enabling the lubricating graphite to perform its function, but adheres the graphite to the asbestos and the graphite particles to one another. The permeation with the surface layer material may take place to a substantial depth or entirely through the compressible layers, but preferably extends for a short distance into the thickness of the compressible material at the exposed surfaces thereof.

Instead of forming the compressible layers in sheets, they may be applied to the insert as a pulp with or without a waterproof adhesive and shaped thereon to final form.

The application of the graphite is carried on after the combining operation as well as after the punching operation in lieu of being applied to the sheets before the combining operation as indicated herein. That is to say, the graphite may be applied to the composite sheet or to the gasket. The graphitizing, however, is preferably accomplished before the gasket is presented to the bath. In this connection, while I have referred particularly to graphite, powdered mica may in some cases be employed.

Also the punching operation may be omitted and the gaskets punched from the sheets after the sheets have been passed through the bath but it is preferable to pass the raw gaskets through the bath since in that manner the envelop is formed about the exposed edges of the passages and marginal edges of the gasket as well as upon the surface layers in a single operation.

I have referred herein to the use of several waterproof adhesives which are incorporated in the fibrous material and which are present in controlled amounts to regulate permeation with the surface layer forming material. In this connection, fillers may be employed in lieu of the waterproof adhesive and mixed with the fibres to control the permeation with the bath material, but I prefer the waterproof adhesives mentioned because they add strength and resistance to the gasket as explained in my aforesaid patent.

Thus I use in some cases for the gasket material 10, treated paper, that is, paper of various types, i. e., long or short fibre which has been saturated with glue and glycerine and formaldehyde. Also compressed asbestos sheets wherein rubber is used as a binder for the asbestos, the rubber content being from 10 to 15% with a small percentage of sulphur to obtain a semi-vulcanization, and in some cases, a small amount of coloring matter. The asbestos comprises 85% of the sheet.

In addition to these materials, I have also used paper-like webs of varying thickness and formed of a mixture of cork and fibres which have been treated with water and oil resistant material such as glue, glycerine and formaldehyde. All of these various sheet materials I find can be united to the insert by the use of a combining pressure which will deform the projections without causing any deterioration of the sheet.

Other gasket materials may be utilized and I have mentioned the various ones herein which have proven highly practical in use.

In Figures 11 to 14, I have illustrated a modified form of gasket constructed in accordance with my aforesaid patent and applications and wherein two or more of the complete gaskets are superposed and bonded together by means of stitching. The stitching is accomplished on a suitable machine and preferably a wire thread is employed. I have illustrated, in Figure 11, three superposed gaskets constructed in accordance with my aforesaid patents united by stitching 31, it being noted that the stitch extends entirely through the several superposed layers and provides a very effective bonding of the several laminations of the final article. While I have illustrated the exposed portions of the stitching as extending above the plane or the outer surfaces of the gasket, it will be understood that in some cases I compress the stitch on the gasket, so that the outer surfaces thereof are substantially smooth and unobstructed.

Figure 15:
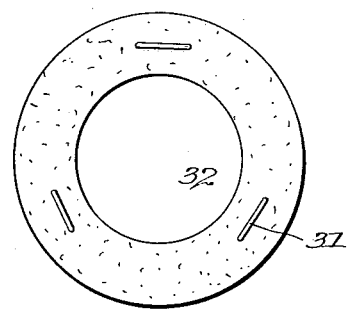
Figure 15 is a top view of the gasket shown in Figures 11 to 14.
Figure 11:
Figure 11 is a sectional view broken away of a gasket comprising three superposed gaskets which for purposes of illustration are made in accordance with my said patents or combinations thereof and held in superposed relation by stitching at spaced points.

In Figure 15, I have shown a circular gasket constructed in accordance with Figure 11 and having a fluid passage 32. I have illustrated three stitches 31 arranged in spaced relation, but it will be understood that any desired number may be employed.

The metal layers or inserts will have the projections preferably extending entirely through the gasket layers and clenched over on the outer surfaces of said gasket to produce smooth and unobstructed surfaces, so that a close surface to surface fit is secured and a leakproof gasket obtained.

Instead of stitching together gaskets comprising a metal insert and layers of gasket material on opposite sides thereof, I will, in some cases, stitch together gaskets comprising a layer of gasket material and a layer of the metal insert or reinforcing material.

A further product is comprised of a layer of metal which, in some cases, will be either perforated and formed with projections or plane, stitched on one or both sides to a layer of paper-like material comprising cork and fibers saturated with a tanned glutinous adhesive as hereinabove described.

Referring to Figures 12 and 13, I build up a gasket of layers having a metal insert therein and layers 33 which are devoid of metal insert material. In Figure 14, the layers 33 of cushion material are each devoid of metal but have on their surfaces, a metal layer 34 which is preferably of thin steel but for certain applications, may consist of copper. The gaskets may have any desired size and shape and the respective layers are co-extensive.

I have illustrated the layers of the gaskets shown in Figures 11 to 15 as united by the metal stitching 31 but it will be understood that other fastening means may be employed, for example, grommets, or the layers may be simply adhered together depending, however, upon the particular applications.

The use of a metal layer 34 with any of the several gaskets described herein is carried out in some cases and in this event, the use of a graphite layer is avoided. In lieu of using a sheet metal facing 34, steel, copper, tin, or aluminum foil may be used. In forming the built up gaskets, the units are arranged in superposed relation with their service openings and bolt and water holes (in the case of larger gaskets) in register, whereupon the respective units are united by the stitching. Where an adhesive is used, the adhesive is disposed on the contact surfaces of one or both of the units, the units brought into register and then compressed and the adhesive dried. With a grommeted structure, the units are likewise brought into register and grommets applied at the desired openings, for example, the bolt holes with the flange of each grommet engaging one surface of the gasket and a turned over flange on the other end of each grommet pressed upon the opposite surface of the gasket.

Figure 9:
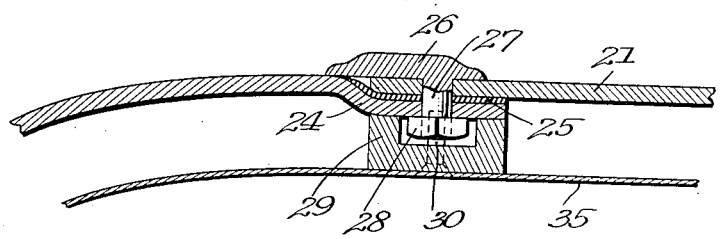
Figure 9 is a sectional view broken away of the top frame showing my improved unitary top applied thereto.
Figure 10:
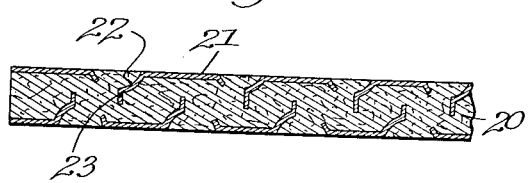
Figure 10 is a detailed sectional view of the top material employed in Figure 9.

Referring to Figures 8, 9 and 10, I have illustrated an improved structural material, particularly useful, for the tops of motor vehicles. This material follows to some extent the disclosure in my Patent 2,029,302. It comprises a core 20 of fibrous or other base material having the desired body, i. e., rigidity and flexibility, and will consist of one of the various materials referred to herein. It is preferably cardboard or laminated paper of required thickness. The core 20 is suitably waterproofed as also described herein, whereby the fibers are additionally bonded and protected against the action of water and moisture.

Referring to Figure 10, I have illustrated the material in detail and it will be noted that it consists of the core 20 having applied to each side thereof a layer of perforated material, i. e., sheet steel 21, such as shown in my aforesaid patents from which have been struck-up or formed projections here illustrated as protuberances 22 and tangs 23. The projections are embedded within the fibrous layer 20, by compressing the layers together as shown, to produce a reinforced and rigid structure which, however, possesses sufficient flexibility for top material for automobiles, as well as resiliency and is resistant to warping or cracking. The perforated structure of the metallic reinforcement with its projections renders the top sound-absorbent and relieves the motor car of undue noise or "roar" heretofore experienced with conventional top structures. While I preferably employ metal reinforcing layers 21 upon both sides of the core 20, I find that, in some cases, a single layer will be sufficient.

It will be noted that the projections extend interiorly of the core 20, but not entirely through the same and act to dissipate or transfer heat from the surfaces thereof. Furthermore, where the core is formed of sound insulating material, such as paper-like webs of comminuted cork and fibre as described in United States Patents Nos. 1,888,409 and 1,888,410, the provision of the reinforcements constructed as described will amplify the sound-absorbent qualities of the top material.

The exposed surfaces of the top material may be lacquered with a suitable weather-resistant material, that is one which will resist the action of moisture and water, as well as heat and such coating, of course, will be applied to the metal surfaces, as shown in Figure 10, or where only one such metal reinforcement is used, the coating will be applied to this metal surface, as well as to the exposed surface of the core. Preferably a top covering of weather resistant material such as artificial leather is applied to the exposed surface of the top.

In Figure 9, I have illustrated the top material shown in Figure 10 applied to the top of a motor car frame. The said top frame is bent downwardly to receive the top, as shown at 24, and a suitable sealing and cushion material 25, such as sheet rubber or comminuted cork and rubber, or comminuted cork and fiber, is employed to seal the joint, as shown. The top is held in position by any suitable fastening construction and I have illustrated a molding strip 26 having spaced preferably integral studs 27 extending therefrom and through registering openings in the top, the sealing material and the frame. The studs are engaged beneath the frame by nuts 28, whereby the top is tightly held in position. The molding strip may be continuous and extend around the top of the car or may be in separate strips as desired and studs in some cases separable. A strut member 29, preferably of wood, is attached to the frame member 24 by means of screws or bolts 30 and to this strut member is adhesively united or otherwise secured the usual upholstery or top fabric trim 51.

Instead of employing the strut members 29, in some cases, I adhesively unite the fabric material 51 directly to the undersurface of the top, so that the composite and unitary top will comprise an exposed layer of a suitable weatherproof lacquer or artificial leather surface finish, and an exposed interior layer of the fabric or trim. Such structure may be prepared at the factory and shipped to the automobile assembly line ready for immediate attachment to the vehicle frame.

It will be observed that this top material may have any suitable core 20 of flexible, resilient and waterproof material. To one or both sides of the core are united the metal layers having projections and adjacent openings. The exposed surfaces of the composite material will then be provided with any suitable coating or finish or trim.

By having a unitary article, it will be seen that the top will be applied at the assembly line with a minimum of effort and likewise may be moved with equal facility. The top will be made of a size in accordance with requirements and will be completely finished, i. e., provided with its final surface appearance at the manufacturing plant and in this condition, delivered to the automobile assembly line.

In Figures 8, 9 and 10, I have illustrated of course, only a portion of an automobile and a portion of the top. This, I have done for convenience of illustration. Likewise, it will be understood that the projections in the metal sheets and the openings adjacent thereto are multitudinous and preferably extend throughout the areas of the metal sheets, the latter being substantially coextensive with the fibrous or other core.

In forming the material of Figure 10, the layers are fed in proper superposed relation and combined after the manner shown in Figure 6, or preformed layers are combined as in Figure 7.

Various modifications may be resorted to within the province of this invention, all of which, however, are considered to be comprehended in the appended claims.

This application is a continuation in part of my copending application Serial No. 648,691, filed December 23, 1932, which has now issued as Patent No. 2,055,471, dated September 29, 1936.

I claim:

1. The method of making laminated gaskets comprising combining a layer of metal having up-struck projections with a co-extensive layer of compressible material and imbedding the projections therein forming a layer of non-sticking material on the layer of compressible material, forming a relatively thin layer of protective material over said non-sticking layer for protecting the same and binding the non-sticking layer to the layer of compressible material, and forming a gasket from said laminated structure.

2. The method of making laminated gaskets comprising combining a layer of metal having up-struck projections with a co-extensive layer of compressible material and imbedding the projections therein forming a layer of non-sticking material on the layer of compressible material, forming a gasket from such laminated structure, and forming a relatively thin protective layer on the surface of said gasket for enclosing the non-sticking layer and binding the same to the compressible layer.

3. The method of making laminated gaskets comprising combining a layer of metal having up-struck projections with a co-extensive layer of compressible material and imbedding the projections therein forming a layer of non-sticking material on the layer of compressible material, forming a relatively thin layer of protective material over said non-sticking layer for protecting the same and binding the non-sticking layer to the layer of compressible material, hardening said last mentioned layer, and forming a gasket from said laminated structure.

4. The method of making laminated gaskets comprising combining a layer of metal having up-struck projections with a co-extensive layer of compressible material and imbedding the projections therein forming a layer of non-sticking material on the layer of compressible material, forming a gasket from such laminated structure, forming a relatively thin protective layer on the surface of said gasket for enclosing the non-sticking layer and binding the same to the compressible layer, and hardening said last mentioned layer.

5. The method of making laminated gaskets comprising forming a layer of non-sticking material on a layer of compressible material, combining with said compressible layer a metallic layer having projections by embedding the projections in said compressible layer, forming a gasket from such laminated structure, and forming a relatively thin protective layer on the surface of said gasket for enclosing the non-sticking layer and binding the same to the compressible layer.

6. The method of making a laminated gasket which comprises continuously feeding a strip of metal having up-struck projections formed thereon, continuously feeding in combining relation with said metal layer, a strip of cushion material, applying a layer of non-sticking material to said cushion material, combining the layers, and punching a gasket therefrom.

7. The method of making a laminated gasket which comprises continuously feeding a strip of metal having up-struck projections thereon, continuously feeding in combining relation with said metal strip, a strip of cushion material, combining said strips, applying a layer of graphite to the surface of the combination, and punching a gasket from the combination.

8. The method of making a laminated gasket which comprises continuously feeding strips of metal having up-struck projections formed thereon in association with cushion layers having a surface laminae of graphite, combining the layers and embedding the projections in the cushion layers, punching out a gasket from the composite strip, subjecting the gasket to a coating operation and forming over the surface thereof a protective envelop binding the graphite to the cushion layers and forming a smooth continuous surface.

9. The method of making a laminated gasket which comprises continuously feeding strips of metal having up-struck projections formed thereon in association with cushion layers, combining the layers and embedding the projections in the cushion layers, applying a layer of non-sticking material to the surfaces of the cushion layers, punching out a gasket from the composite strip, subjecting the gasket to a coating operation and forming over the surface thereof a protective envelop forming a smooth continuous surface.

10. The method of making a laminated gasket which comprises continuously feeding strips of metal having up-struck projections formed thereon in association with cushion layers, combining the layers and embedding the projections in the cushion layers, applying a layer of graphite to the surfaces of the cushion layers, punching out a gasket from the composite strip, subjecting the gasket to a coating operation and forming over the surface thereof protective envelop binding the graphite to the cushion layers and forming a smooth continuous surface.

11. The method of making laminated gaskets comprising combining a metal layer having up-struck projections formed thereon with a layer of cushion material having a surface lamina of non-sticking material and embedding the projections in the cushion layer, punching out a gasket from the composite strip, subjecting the gasket to a coating operation and forming over the surface thereof a protective envelope binding the non-sticking material to the cushion layer.

12. The method of making laminated gaskets comprising forming a layer of non-sticking material on a layer of compressible material, combining with the said compressible layer a metallic layer having projections by embedding the projections in said compressible layer, forming a relatively thin protective layer on the surface of the combined material for enclosing the non-sticking layer and binding the same to the compressible layer and forming a gasket from said combined layers.

13. The method of making a laminated gasket which comprises continuously feeding a strip of metal having up-struck projections formed thereon, continuously feeding in combining relation with said metal layer a strip of cushion material, combining the layers, applying a layer of non-sticking material to said cushion material, and punching a gasket from the combined layers.

14. The method of making a laminated gasket which comprises continuously feeding strips of metal having up-struck projections formed thereon in association with cushion layers having surface laminae of non-sticking material, combining the layers and embedding the projections in the cushion layers, punching out a gasket from the composite strip, subjecting the gasket to a coating operation and forming over the surface thereof a protective envelope binding the non-sticking material to the cushion layers and forming a smooth continuous surface.

15. The method of making a laminated gasket which comprises continuously feeding strips of metal having up-struck projections formed thereon in association with cushion layers having surface laminae of graphite, combining the layers and embedding the projections in the cushion layers, and punching out a gasket from the composite strip.

GEORGE T. BALFE.